March 22, 1932.     F. JOHNSON     1,850,753
HARVESTING MACHINE
Filed Jan. 2, 1931
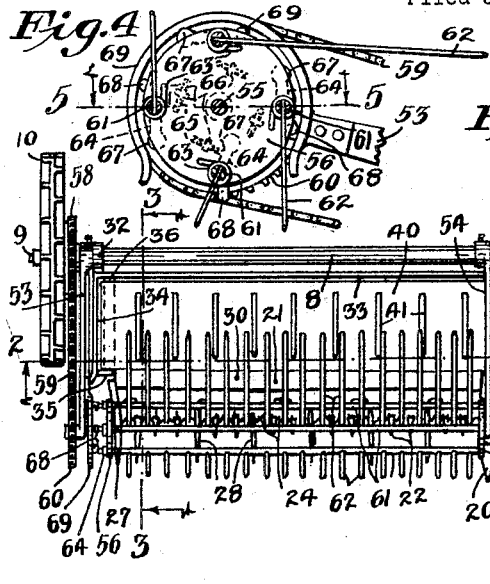
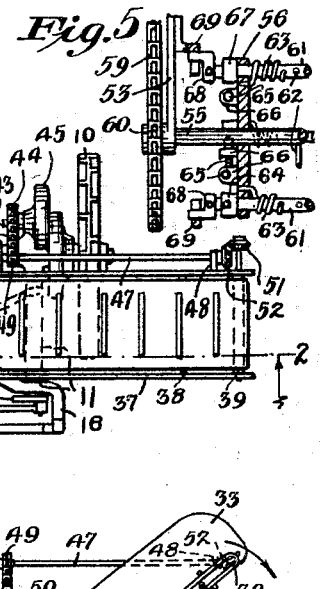
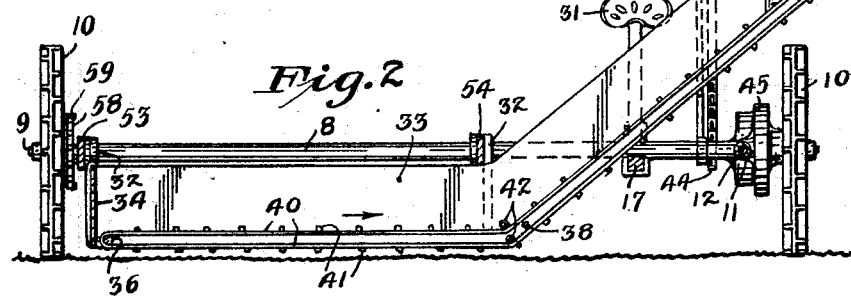
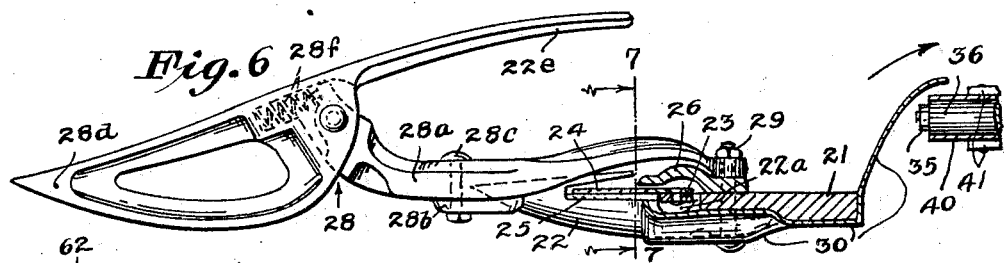
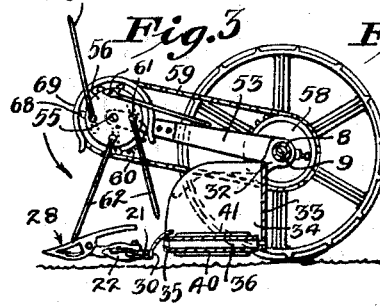
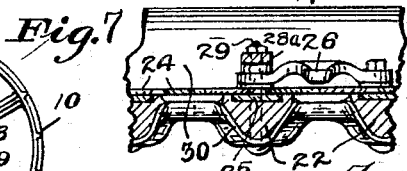
Inventor
Frank Johnson
By his Attorneys
Williamson & Williamson Patented Mar. 22, 1932

1,850,753

UNITED STATES PATENT OFFICE

FRANK JOHNSON, OF SLEEPY EYE, MINNESOTA

HARVESTING MACHINE

Application filed January 2, 1931. Serial No. 506,090.

This invention relates to harvesters and it relates particularly to harvesters for harvesting vine crops, such as peas.

In harvesting peas by use of machinery, it is necessary that a sickle knife be used which rides directly on the ground in order that the entire crop be cut. If a knife similar to the knife of an ordinary mower is used, the dirt from the field, particularly if moist, will soon accumulate on the bottom of the cutter bar between the knife guards and this dirt will gradually build up to interfere with the proper action of the sickle bar and sickle knife. It is, therefore, desirable to provide means for preventing the accumulation of dirt between the guards and the cutter bar.

In the northwestern part of the United States, peas are extensively raised for canning purposes. The canning factories locate what are known as viner stations near groups of farms where the peas are raised and the peas, together with the vines, are immediately brought to these stations after being harvested and the peas are there separated from the vines and shelled. It is essential that the peas after being cut, be brought without delay to these viner stations. A delay of even a few hours in separating and shelling the peas after they are cut will depreciate the value of the peas for canning purposes considerably. It is, therefore, desirable to provide, in a pea harvester, an elevator which can be used in connection with a sickle knife riding on the ground and will gather the crop as it is cut and will deliver the same to a wagon or other vehicle so that the cut peas together with the vines may be immediately transported to the viner station without delay. If such an elevator is used, it is necessary to convey the peas and vines from the sickle knife to the elevator and in conveying mechanism that may be used, it is essential to provide means for readily releasing the peas and vines from the parts carrying the same to deliver the same to the elevator without permitting them to cling to and accumulate on the conveying mechanism.

It is an object of this invention therefore to provide a harvester for harvesting vine crops such as peas, which includes a sickle knife riding on the ground and means for preventing the accumulation of dirt between the guards and cutter bar forming part of the sickle knife.

It is another object to provide such a harvester including a sickle knife riding on the ground and an elevator located behind the sickle knife and adapted to deliver the cut crop to a wagon or the like following the harvester in the field.

Yet another object is to provide in such a machine a suitable reel or conveying mechanism, which will deliver the cut crop to the elevator without permitting the accumulation of vines on the said conveying mechanism.

The objects and advantages of the present invention will more fully appear from the following description, made in connection with the accompanying drawings, in which like characters refer to the same or similar parts throughout the various views and in which, Fig. 1 is a plan view of a harvester embodying the present invention;

Fig. 2 is a vertical section taken on the line 2—2 of Fig. 1 as indicated by the arrows;

Fig. 3 is a vertical section taken on the line 3—3 of Fig. 1 as indicated by the arrows;

Fig. 4 is a vertical section similar to Fig. 3 but illustrating portions of the reel in enlarged scale;

Fig. 5 is a horizontal section taken on the line 5—5 of Fig. 4, as indicated by the arrows;

Fig. 6 is a view illustrating some of the parts as shown in Fig. 3 on enlarged scale; and Fig. 7 is a vertical section taken on the line 7—7 of Fig. 6, as indicated by the arrows.

Referring to the drawings, portions of a machine quite similar in many respects to an ordinary mower are illustrated. Part of the frame of the machine is formed by a long housing 8 within which is journaled a shaft 9 on the ends of which ground engaging wheels 10 are mounted. A gear casing 11 projects forwardly from the gear casing 8 adjacent the left side of the machine and a shaft 12 mounted within the housing 11 is driven from the left wheel 10 of the machine through suitable housed gearing. The shaft 12 carries a disk 13 at the forward end of the housing 11 and this disk has, as usual in mower constructions, a pitman 14 eccentrically pivoted thereto. A drag bar 15 is pivoted for vertical swinging movement to a brace 16 secured to the forward end of the housing 11 and running diagonally rearwardly to the draw bar 17 of the machine and to the housing 8. The drag bar 15 is pivotally connected for vertical swinging movement at its right end to a member 18 mounted for swinging movement about a horizontal axis on a push bar 19 extending diagonally rearwardly and connected at its rear end to the housing 8 adjacent its juncture with the housing 11. The rear end of the push bar 19 is, of course, pivoted to the housing 8. Pivotally secured to the member 18 is the inside shoe 20 of the sickle knife and a cutter bar 21 is secured to this shoe and extends toward the right end of the machine. The cutter bar has the usual guards 22 mounted on the lower side thereof and projecting forwardly from the cutter bar in spaced relation and these guards have grooves 22a in their upper faces adjacent their rear ends within which the sickle bar 23 is disposed. The pitman 14 is of course pivotally connected at its right end to the sickle bar 23 and the sickle bar carries the usual blades 24, which bear against and work over cooperating blades 25 mounted in the guards 22. Knife holders 26 are mounted on the cutter bar 21 at spaced points to hold the sickle blades 24 adjacent the guard blades 25. A divider 27 is secured to the right end of the cutter bar 21. As the sickle knife used is of standard construction for mowers, there is no need of going into further detailed description of the same. Grain saver guards 28 are mounted on certain of the guards 22 and these grain saver guards are also of standard construction and include merely brackets 28a clamped by plates 28b and bolts 28c to the forward ends of the guards 22 and secured by certain of the bolts 29 to the cutter bar 21, which bolts 29 are those which secure the guards 22 to the cutter bar 21. The grain saving guards 28 also include pointed and upwardly curved members 28d pivoted to the brackets 28a and terminating in arms 22e located well above the blades 24 and 25 of the sickle knife. A spring 28f bears against a lug on the bracket 28a and against the member 28d to hold the member 28d normally in downwardly swung position against a stop formed on the bracket 28a. The spring 28f fits within recesses in the members 28b.

In accordance with the present invention, a long plate 30 is secured to the lower surface of the cutter bar 21 and this plate is curved upwardly and rearwardly from the cutter bar. The plate 30 also has a forward portion which is shaped to fit the bottom of the cutter bar and to encompass the guards 22 at the rear portions of their lower surfaces, and to fit upwardly between adjacent guards 22. The forward portion of the plate 30 accordingly extends below the sickle bar 23 and curves upwardly between the guards 22 and the dirt that would otherwise accumulate and build up on the lower surfaces of the cutter bar and guards 22 to interfere with the action of the sickle bar 23 will accumulate on the forward portion of the plate 30. Any dirt accumulating on the plate 30 cannot build up to interfere with the action of the sickle bar 23.

A spring seat 31 is secured to the housing 8 adjacent the left end of the same. Secured to the housing 8 adjacent the right end of the same and to the right of the seat 31 respectively, are downwardly projecting arms 32 to which a backward 33 for an elevator is secured. The backboard 33 is vertically disposed and runs parallel to the housing 8 behind the sickle knife and then extends in inclined relation to a point outwardly disposed from the left side of the machine well above the left wheel 10. A vertical end bored 34 is secured to the right end of the blackboard 33 and projects forwardly therefrom and this end board carries a small bracket 35 which projects toward the left side of the machine at the lower edge of the end board. A roller 36 is journaled in the bracket 35 and the backboard 33. A vertically disposed and inclined front board 37 is mounted in parallel relation to the inclined portion of the backboard 33 as by means of rods 38 and an upper roller 39 is journaled in the upper ends of the backboard 33 and the front board 37 adjacent the lower edges thereof. An endless belt 40 preferably having slats 41 on its outer surface runs over the rollers 36 and 39 and over rollers 42 carried by the backboard 33 adjacent the lower end of the inclined portion thereof and also carried by the front board 37 adjacent the lower end thereof. A shaft 43 carrying a sprocket 44 is journaled in a gear casing 45 secured to the housing 8 and containing gears suitably driven from the left wheel 10 of the machine. A long arm 46 is secured to the housing 8 adjacent its left end and this arm runs upwardly and forms a bearing for a counter shaft 47 also journaled in a bearing 48 carried by the backboard 33 adjacent its upper end. A sprocket 49 is mounted on the shaft 47 and a sprocket chain 50 runs over the two sprockets 44 and 49. The shaft for the roller 39 is rearwardly extended from the backboard 33 and carries a beveled gear 51 meshing with a beveled gear 52 mounted on the left end the shaft 47. In place of the construction described, it will be understood that any suitable means may be provided for driving the elevator formed by the backboard 33, end board 34, front board 37, rollers 36 and 39 and endless belt 40. It should here be noted that although the sickle knife is pivotally mounted so that it may ride on the ground and may yield to conform to the general contour of the ground, the elevator is secured to the housing 8 and both the upper and lower horizontal runs of the belt 40 are disposed well above the ground. The rearwardly and upwardly curved portion of the plate 30 extends above the upper horizontal run of the endless belt 40 and this plate is connected in no way to the elevator structure.

A forwardly projecting arm 53 is secured to the housing 8 adjacent the right end of the same, while a similar arm 54 is secured to the housing 8 almost directly behind the inside shoe 20. These two arms are held on the housing 8 by means of set screws so that they may be adjusted upwardly or downwardly and their forward ends are disposed above the sickle knife and preferably slightly forwardly therefrom. A shaft 55 is journaled in the forward ends of the two arms 53 and 54 and this shaft has mounted thereon, adjacent the two arms, spaced heads 56 and 57 respectively, which, as illustrated in the drawings, may be merely disks. A sprocket 58 is carried by the right wheel 10 and a sprocket chain 59 runs over the sprocket 58 and over a sprocket 60 carried on the right end of the shaft 55 beyond the arm 53. Pivotally mounted in and extending between the two heads 56 and 57 in radially spaced relation from the shaft 55 and in circumferentially spaced relation in the heads 56 and 57 are a plurality of horizontally disposed rods 61. These rods each carry a plurality of longitudinally spaced tines 62 which project outwardly from the rods. The heads 56, shaft 55 and rods 61 form an open work drum, which during travel of the machine is adapted to move downwardly and rearwardly at its forward lower edge. The tines 62 are of such length that they will extend to points adjacent the guards 22 for the sickle knife as the drum is rotated. Coiled springs 63 surround the rods 61 adjacent the left side of the head 56 and these springs are each anchored at one end in the head 56 and are anchored at the other end in the respective rods. The springs 63 accordingly place the rods 61 and the tines 62 carried thereby under resilient tension to move in the same direction as the direction of rotation of the drum and in a counter clockwise direction as viewed in Figs. 3 and 4. The right ends of the rods 61 project beyond the right side of the head 56 and carry arms 64 thereon, which project in an opposite direction from the rods than the direction of extension of the tines 62 and stop screws 65 are adjustably mounted in ears 66 carried on the right side of the head 56. Stop screws 65 are adapted to engage the arms 64 to limit movement of the rod 61 in a counter clockwise direction as viewed in Figs. 3 and 4 and occasioned by the springs 63. The arms 64 also carry weights 67 which counter balance or partially counter balance the weight of the tines 62, so that the rods 61 may be readily swung in the heads 56 and 57. Angular arms 68 are carried at the extreme right end of the rods 61 for cooperation with a horseshoe-shaped cam 69 mounted on the right arm 53. The cam 69 is disposed with its open portion downwardly as best shown in Fig. 4 and the arms 68 are of such length that during rotation of the drum, these arms will strike the cam 69 shortly after the lower ends of the tines 62 have been carried to a position above the upper horizontal run of the endless belt 40 of the elevator. As the drum continues to rotate after an arm 68 has engaged the inner surface of the cam 69, the rod 61 to which the said arm 68 is attached, will be swung in a clockwise direction as viewed in Fig. 3 and in Fig. 4, to carry the tines to a more nearly vertical position over the belt 40. In other words, the tines 62 carried by the rods 61 acted on by the cam 69 will be swung in a direction opposite to the direction of rotation of the drum and against the tension of the spring 63. Engagement of the arm 68 with the cam 69 will maintain the tines 62 in this same position until the arm 68 is released from engagement with the cam 69 at the forward lower end thereof. Upon release of the arm 68 from the forward lower end of the cam 69, the spring 63 will quickly swing the rod 61 in the same direction as the direction of rotation of the drum and until the arm 64 strikes the top screw 65 cooperating therewith. The tines 62 on the particular rod 61 in question, will accordingly be swung quickly downwardly and rearwardly to points adjacent the grain saving guards 28.

The operation of the machine is probably obvious from the above description. As the machine is drawn along the field in which the peas or other crops to be harvested are growing, the tines 62 on the various rods 61 will be successively swung downwardly to carry the peas and vines into the sickle knife. As the sickle knife rides directly on the ground and has freedom for tilting action to conform generally to the shape of the ground, the sickle knife will cut the vines close to the ground. The tines 62 will carry the vines and peas over the grain saving guards 28 and sickle knife and over the upwardly inclined portion of the plate 30 to a point above the upper run of the horiontal portion of the belt 40 of the elevator. At this point the cam 69 will act to swing the tine 62 to tilt them to a more nearly vertical position and thereby cause the vines and peas to slide downwardly on the tines onto the elevator belt 40. The elevator will then deliver the vines and peas over the left side of the machine to discharge into a wagon, which may be driven in the field at the left side of the machine. As the rods 61 are carried to a position adjacent the lower forward end of the cam 69 during rotation of the drum, the rods will be quickly swung downwardly into the pea vines to act much in the same manner as the reel of a binder to carry the vines into the sickle knife. After the following wagon has been completely filled with vines and peas, the wagon may be immediately driven from the field to the viner stations where the peas may be immediately separated from the vines and shelled.

It will be seen that the machine is capable of various adjustments. The forward ends of the arms 53 and 54 may be variously located relative to the cutter knife and the extent of movement of the rods 61 may be readily varied by adjustment of the stop screws 65 in the ears 66.

The device is quite simple in construction and in operation.

It will, of course, be understood that various changes may be made in the form, details, arrangement and proportions of the various parts without departure from the scope of the present invention, which generally stated consists in the matter shown and described and set forth in the appended claims.

What is claimed is:—

1. A crop lifting and feeding machine for harvesters having in combination, a supporting structure, a drum journaled therein and including a pair of spaced heads and a plurality of cross rods mounted for swinging movement in said heads and extending there between, tines carried by said rods and projecting outwardly therefrom, means for rotating said drum and means for swinging said rods and tines in said heads in a direction opposite to the direction of rotation of said drum, as said tines are carried beyond a certain position, means for swinging said rods and tines in said heads in the direction of rotation of said drum as said tines are carried beyond another certain position, and means for limiting the possible swinging movement of said rods and tines in the direction of rotation of said drum.

2. A crop lifting and feeding machine for harvesters having in combination, a supporting structure, a drum journaled therein and including a pair of spaced heads and a plurality of cross rods mounted for swinging movement in said heads and extending there between, tines carried by said rods and projecting outwardly therefrom, means for rotating said drum and means for swinging said rods and tines in said heads in a direction opposite to the direction of rotation of said drum, as said tines are carried beyond a certain position, and means for varying the extent of swinging movement of said rods and tines relative to said heads.

3. A crop lifting and feeding machine for harvesters having in combination, a supporting structure, a drum journaled therein and including a pair of spaced heads and a plurality of cross rods mounted for swinging movement in said heads and extending there between, tines carried by said rods and projecting outwardly therefrom, means for rotating said drum and means for swinging said rods and tines in said heads in a direction opposite to the direction of rotation of said drum, as said tines are carried beyond a certain position, and means mounted on said rods for counterbalancing the weight of said tines.

4. A crop lifting and feeding device for harvesters having in combination, a supporting structure, a drum journaled therein and including spaced heads and rods extending between and journaled in said heads, tines carried by said rods and projecting outwardly therefrom, means for rotating said drum, resilient means urging the free ends of said tines in the direction of rotation of said drum, stops limiting the action of said resilient means and means for swinging said tines in an opposite direction to the direction of rotation of said drum against the tension of said resilient means when said tines have been carried to a certain position during rotation of said drum, and for releasing said tines to permit said resilient means to act on the same when said tines have been carried to a further point by continued rotation of said drum.

5. A crop lifting and feeding device for harvesters, comprising a supporting structure, a shaft journaled therein, a pair of spaced heads mounted on said shaft, a plurality of rods extending between and journaled in said heads, tines carried by each of said rods and projecting outwardly therefrom, means for rotating said shaft, resilient means urging the free ends of said tines in the direction of rotation of said shaft, stops limiting the movement of said tines in the direction of rotation of said shaft, arms carried by said rods and a cam mounted on said supporting structure and against which said arms are adapted to ride, to swing said tines against the tension of said resilient means in an opposite direction to the direction of rotation of said shaft when said tines have been rotated with said shaft to a certain position and releasing said arms to permit said resilient means to act when said tines have been rotated with said shaft to a further position.

6. In a harvesting machine, a sickle knife adapted to ride on the ground and pivoted for upward and downward swinging movement, an elevator mounted on the machine behind and above said knife and means for lifting and feeding vines and other crops cut by said knife rearwardly and upwardly from said knife to said elevator.

7. In a harvesting machine, a frame, a sickle knife mounted on said frame for swinging movement in a vertical plane and adapted to ride directly on the ground, an elevator mounted behind said sickle knife on said frame and above said sickle knife, a plate secured to said sickle knife and projecting upwardly and rearwardly over said elevator and means cooperating with said sickle knife to carry crops cut by the same upwardly and rearwardly over said plate and onto said elevator.

8. In a harvesting machine, a cutter bar, a plurality of knife guards secured to said bar and projecting forwardly therefrom in spaced relation, said guards having alined grooves in their rear upper surfaces, a sickle bar working within said grooves, guard knives mounted on said guards, sickle knives mounted on said sickle bar and a dirt protector secured to the lower sides of said guards, conforming to the curvature of portions of the guards and projecting upwardly between said guards toward said sickle knives to prevent the accumulation of dirt between said sickle bar and said guards.

9. In a harvesting machine, a frame, a sickle knife mounted on said frame for swinging movement in a vertical plane and adapted to ride directly on the ground, an elevator mounted behind said sickle knife on said frame and above said sickle knife, guide means extending from said sickle knife upwardly and rearwardly over said elevator and means cooperating with said sickle knife to carry crops cut by the same upwardly and rearwardly over said guide means and onto said elevator.

10. In a harvesting machine, a frame, a sickle knife mounted at one end on said frame for swinging movement in a vertical plane, a divider secured to the other end of the knife and riding on the ground, an elevator mounted behind said sickle knife on said frame and means for lifting and feeding vines and other crops cut by said knife rearwardly and upwardly from said knife to said elevator.

In testimony whereof I affix my signature.

FRANK JOHNSON.